A. W. BARNHART.
CIRCUIT CLOSER FOR ELECTRIC RAILWAYS.
APPLICATION FILED MAY 20, 1914.
1,120,586.
Patented Dec. 8, 1914.
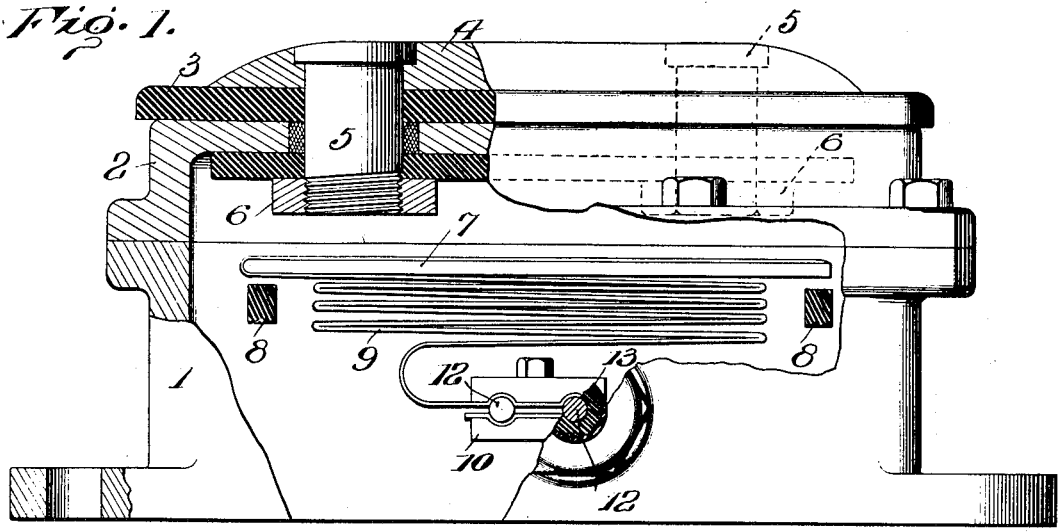
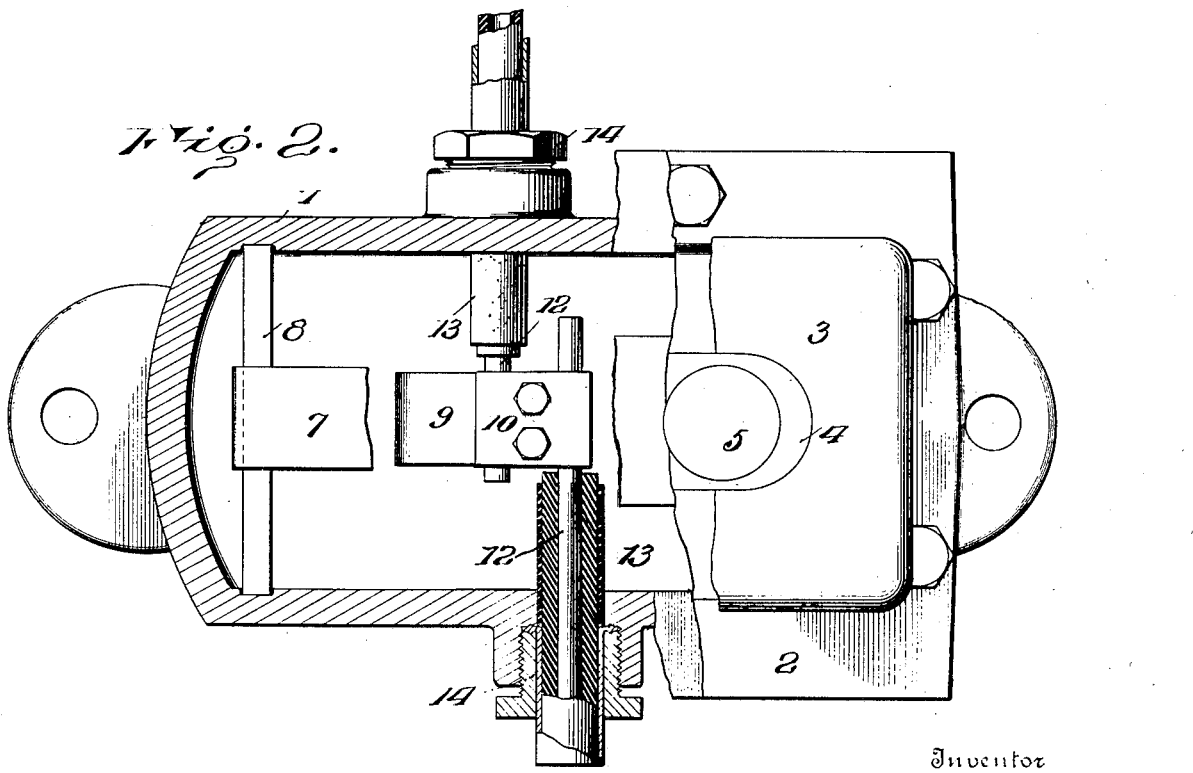
Witnesses
W. A. Williams
Francis S. Magnus
Inventor
Anthony W. Barnhart
By
Attorney

UNITED STATES PATENT OFFICE.

ANTHONY W. BARNHART, OF ELLENBORO, WEST VIRGINIA, ASSIGNOR TO ELECTRIC UNDERCURRENT COMPANY, OF PENNSBORO, WEST VIRGINIA, A CORPORATION OF WEST VIRGINIA.

CIRCUIT-CLOSER FOR ELECTRIC RAILWAYS.

1,120,586.   Specification of Letters Patent.   Patented Dec. 8, 1914.

Application filed May 20, 1914. Serial No. 839,850.

*To all whom it may concern:*

Be it known that I, ANTHONY W. BARNHART, of Ellenboro, in the county of Ritchie and State of West Virginia, have invented certain new and useful Improvements in Circuit-Closers for Electric Railways; and I do hereby declare the following to be a full, clear, and exact description of the invention, such as will enable others skilled in the art to which it appertains to make and use the same.

This invention relates to the class of electric railways of the surface contact type.

The primary object of my invention is to provide simple and highly efficient means for effectively securing the contact plate to the box or casing containing the circuit closer, and utilizing such securing means as the agency for attracting the armature.

In the accompanying drawings, Figure 1 is a side elevation with parts broken away and parts in section. Fig. 2 is a top plan view, parts being shown in section.

Referring to the drawings, 1 designates a metallic box or casing, and 2 a cap of non-magnetic metal preferably secured to the box by screws or bolts. Mounted on the cap 2, but suitably insulated therefrom by a plate 3 of non-conducting material, is a contact plate 4 of non-magnetic metal. This plate is fixedly held to the cap by means of two induction magnets 5 of soft iron suitably insulated from the cap 2 but in direct engagement with the plate 4, the heads of the magnets being flush with the exposed face of the plate. These magnets are of bolt-like formation, having flared heads at their outer ends fitting in counterbored recesses in the plate, while at their inner ends they are held by nuts 6. They are located on either side of the center line of travel of the skate (not shown) which is ordinarily made up of longitudinal bars of magnetic metal joined together by a series of inverted U-shaped electromagnets.

An armature 7 of soft steel is supported within the casing on non-conducting cross pieces 8 which span the space between the sides of the box at each end. The armature has no connection with the casing and is free to rise and fall without interference. To the armature is attached one end of a flexible conductor 9, which I have shown in the form of a copper ribbon folded back and forth on itself, the other end of said ribbon being secured to a terminal clamp 10 designed to receive the ends of sections of the feed wire 12. These sections are inserted through the opposite sides of the casing, and each section is supported within the latter by a fibrous tube 13. The lead sheathing of the conductor sections is flared to serve as gaskets and is held by packing rings 14. By thus providing the wire in sections repairs thereto are more easily made.

In practice, the circuit closer is operated by a magnetic shoe or skate, carried by a car or other electric motor, passing over the box, the magnetism from the skate inducing magnetism in the induction magnets 5, one with its N pole down and the other with its S pole down, thus attracting the armature 7 to the magnetic field. The magnets 5 are of such size relatively to the area of the non-magnetic contact plate 4 that the magnetic flux is concentrated and attracts the armature much more quickly than if the magnetism were distributed through a larger volume of metal. The armature by engagement with the ends of the magnets 5 feeds the current from the feeder wire through the flexible conductor 9 to the contact plate 4 from which it is taken to the car motors. After the skate has passed over the box the armature will fall by gravity, breaking contact between the magnets and the feeder. The armature having no restraining connection with the box is free to rise and fall without any danger of interruption from friction.

I claim as my invention:

1. An electric contact box comprising a casing, a cap for said casing, a contact plate mounted on but insulated from said cap, means for securing said contact plate to said cap, an armature supported in said casing, and a flexible connection between said armature and a source of electric supply, said securing means forming induction magnets for attracting said armature to energize said contact plate.

2. An electric contact box comprising a casing, a cap for said casing, a contact plate of non-magnetic metal mounted on but insulated from said cap, magnets for securing said contact plate to said cap, an armature supported in said casing, and a flexible connection between said armature and a source of electric supply.

3. An electric contact box comprising a casing, a cap for said casing, a contact plate of non-magnetic metal mounted on but insulated from said cap, bolts of magnetic metal for securing said contact plate to said cap, an armature supported in said casing, and a flexible connection between said armature and a source of electric supply, said bolts forming induction magnets for attracting said armature to energize said contact plate.

In testimony whereof, I have signed this specification in the presence of two subscribing witnesses.

ANTHONY W. BARNHART.

Witnesses:
    O. H. GARBER,
    W. H. GRAY.